United States Patent [19]

Posso

[11] Patent Number: 4,625,866

[45] Date of Patent: Dec. 2, 1986

[54] RING FOR SEALING AND STORAGE OF A SPOOL OF RECORDING TAPE

[75] Inventor: Patrick P. P. Posso, Lausanne, Switzerland

[73] Assignee: Gefitec S.A., Lausanne, Switzerland

[21] Appl. No.: 734,475

[22] Filed: May 15, 1985

[30] Foreign Application Priority Data

May 22, 1984 [FR] France .............................. 84 07951

[51] Int. Cl.$^4$ ............................................. B65D 85/67
[52] U.S. Cl. ..................................... 206/400; 206/53; 292/247
[58] Field of Search .................. 206/53–55, 206/400–402; 220/319, 324; 292/113, 247

[56] References Cited

U.S. PATENT DOCUMENTS

| | | | |
|---|---|---|---|
| 2,784,994 | 3/1957 | Hopkins | 292/247 |
| 3,321,230 | 5/1967 | Stollman | 292/247 |
| 3,580,906 | 6/1971 | Budzyn | 292/247 |
| 3,620,478 | 11/1971 | Fitzgerald | 206/400 |
| 3,696,935 | 10/1972 | Dean | 206/400 |
| 3,833,114 | 9/1974 | Osojnak | 206/400 |
| 3,921,798 | 11/1975 | Dean et al. | 206/400 |
| 4,184,705 | 1/1980 | Little | 292/247 |
| 4,388,991 | 6/1983 | Price | 206/400 |

*Primary Examiner*—William Price
*Assistant Examiner*—Jimmy G. Foster
*Attorney, Agent, or Firm*—Kane, Dalsimer, Kane, Sullivan and Kurucz

[57] ABSTRACT

A ring for sealing and storage, a spool of recording tape comprising a band of flexible and extensible matter intended for surrounding a spool and equipped with a hook and a loop for closure and tension. The band, the loop and its link for hingeing onto the band, are all in one piece, the hingeing of the link being ensured by zones of reduced thickness. The whole is moulded on the flat, since when the link is made to pivot backwards the first time, being equipped with ramps it passes by a column by elastic deformation, a return of the link into the original position being then prevented so as to obtain a pre-hooking position of the loop.

5 Claims, 11 Drawing Figures

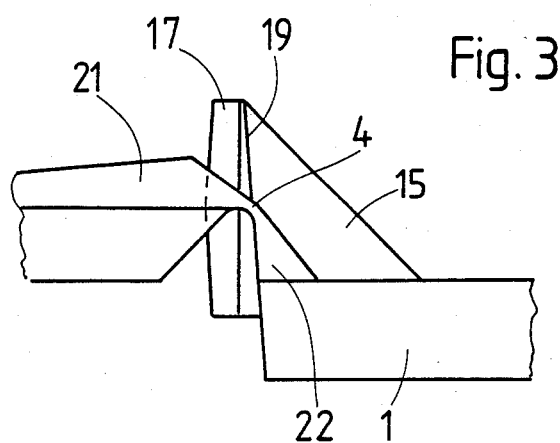
Fig. 3
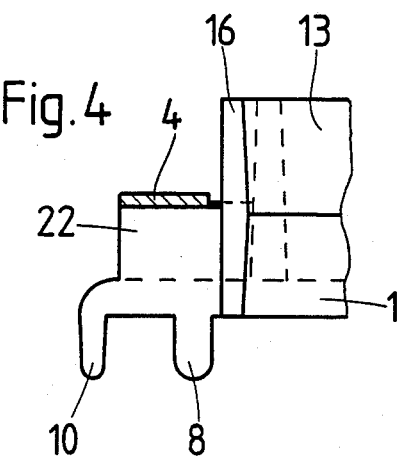
Fig. 4
Fig. 5
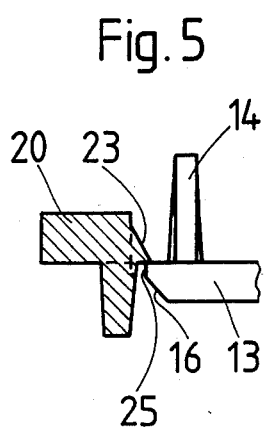
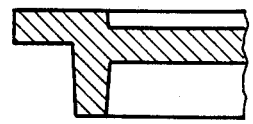
Fig. 6

RING FOR SEALING AND STORAGE OF A SPOOL OF RECORDING TAPE

FIELD OF INVENTION

The present invention concerns a ring for sealing and storage of a spool of recording tape and intended for being employed with a spool comprising a hub and a pair of parallel circular cheeks, the said ring comprising a band of flexible and extensible matter, equipped with longitudinal ribs intended for engaging on opposite sides of each of the cheeks of the spool and equipped at one end of it with a hook and at the other end of it with a loop hinged onto this end and becoming hooked over the hook in order to close the ring and stretch it round the spool, the said loop being hinged onto the band by a link the rotation of which in the open or pre-hooking position is restricted by stop means.

DESCRIPTION OF THE PRIOR ART

Such a sealing ring is described in the U.S. Pat. No. 3,696,935. This sealing ring is in addition diffused widely across the market. It consists of a band of polyethylene at one end of which is hinged a connecting loop of polypropylene which hooks over a hook of different material attached to the other end of the band. The elasticity of the polyethylene ensures the necessary elasticity of the band to enable binding under tension, whilst the relative rigidity of the polypropylene enables this tension to be exerted by means of the loop. For this reason it has only been considered hitherto that it was absolutely necessary to produce the band and the loop in two distinct pieces of two materials exhibiting different characteristics.

On the other hand it is desirable to have a position of partial opening or of pre-hooking in which the loop is hooked onto the hook but not pressed down onto the band, so as to facilitate putting the ring in place round the spool. In this position of pre-hooking, the link connecting the loop to the band is held stopped against a boss on the band in a position substantially perpendicular to the band. Inasmuch as it is necessary to mould the band on the flat, this requirement was equally opposed to the achievement of a band and its loop all in one piece.

The link exhibits in addition two arms equipped each with a pivot which it is necessary to introduce willy-nilly onto a base on the band.

SUMMARY OF THE INVENTION

The aim of the present invention, is to achieve a band and its loop all in one piece, that is to say, to eliminate the assembly of the loop onto the band.

In the sealing and storage ring according to the invention, the band, the loop and its link are all in one piece, the hingeing of the link onto the band being ensured by a zone of reduced thickness, and the band proper is equipped in the hinge zone of the link with at least one column which intercepts the path of the link, the link and/or the column exhibiting an oblique flank so that when the link is made to pivot back the first time the said oblique flank enables the link to pass beyond the columm by elastic deformation, return of the link into its original position in prolongation of the band then being prevented by the same column.

The band and its loop have been produced from polypropylene. By reduction of the cross-section of the band it has been possible to obtain an elasticity equivalent to that of the known bands of polyethylene whilst preserving an equivalent strength and whilst economizing in material.

One might indeed have been able to increase the elasticity of the polypropylene by adding elastomers to it, but such a compound material would have been too costly.

The interception of the path of the link by the column has enabled the problem to be solved, of the position of pre-hooking against a stop. The link becomes, as it were, snapped behind the column when it is raised after moulding.

BRIEF DESCRIPTION OF THE DRAWINGS

The attached drawing represents by way of example one embodiment of the invention as well as a variant upon it.

FIG. 3 is a profile in the direction A of the connection of the link to the band;

FIG. 4 is a partial section along IV—IV in FIG. 1;

FIG. 5 is a partial section along V—V in FIG. 2;

FIG. 6 is a partial section along VI—VI in FIG. 2;

DESCRIPTION OF THE PREFERRED EMBODIMENTS

Figure 1:
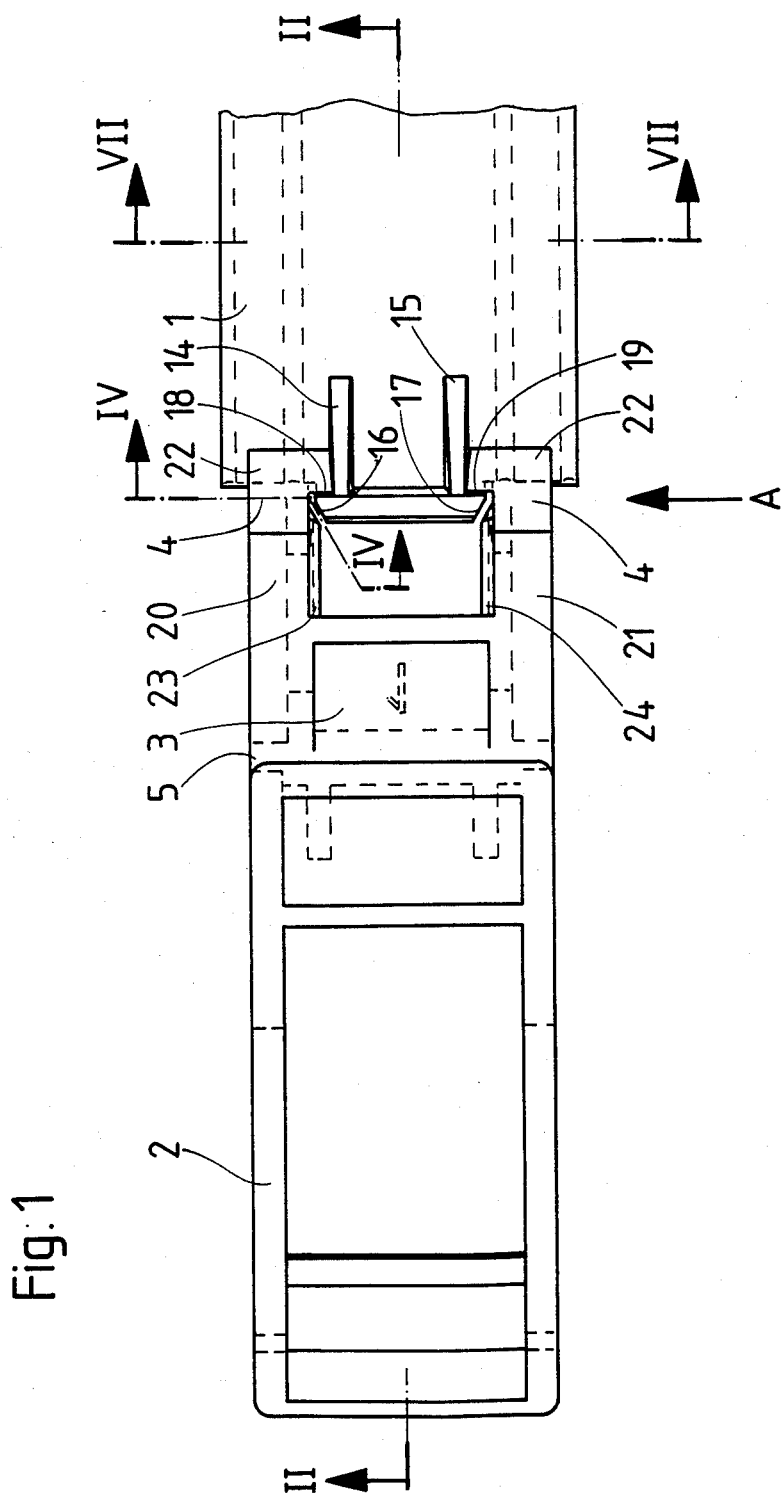
FIG. 1 is a plan view of the loop and the end of the belt in the position of removal from the mould.

The sealing ring partially represented in FIGS. 1 to 9 consists essentially of a profiled band 1 of polypropylene in one piece with a loop 2 connected to the band 1 by a link 3. The hingeing of the link is ensured at one end of it by portions 4 of reduced thickness and at the other end by a portion 5 of reduced thickness. The loop 2 becomes hooked in a manner in itself known, onto a hook 6 (FIG. 9) attached to the other end of the band 1. The hook 6 is integral with a second hook 7 which enables the bound spool to be hung up when being put away.

Figure 2:
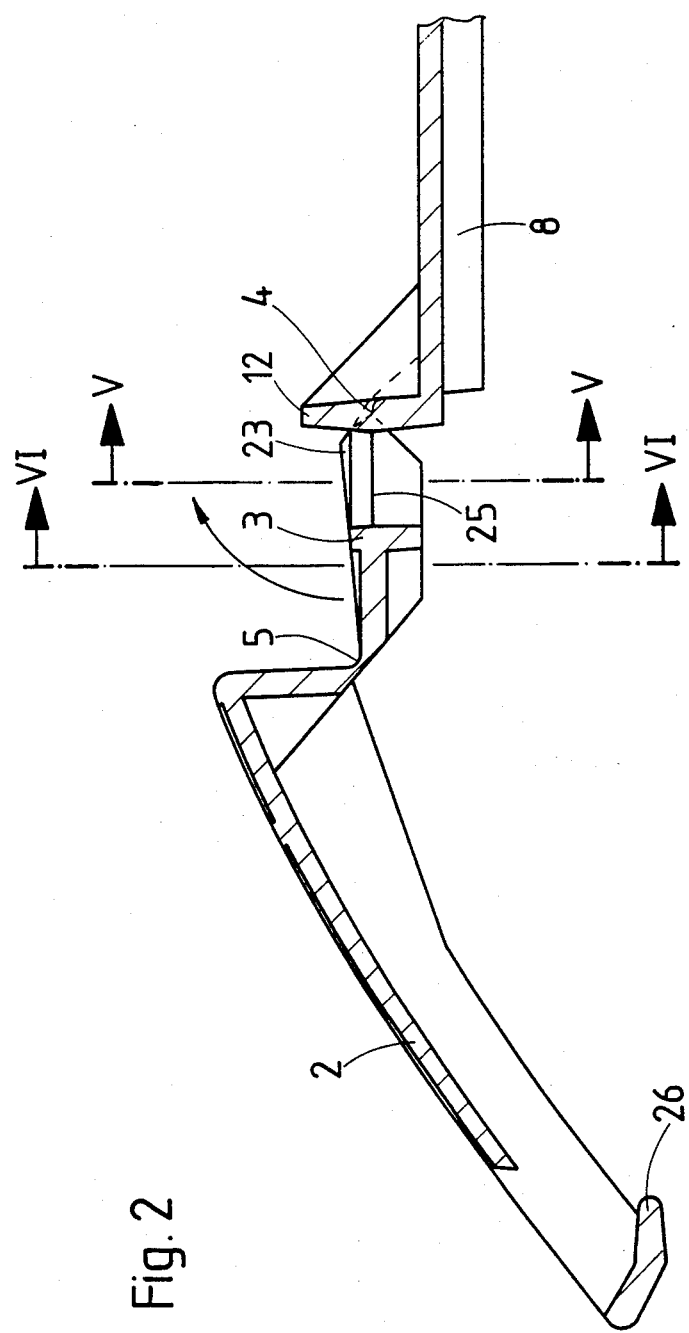
FIG. 2 is a longitudinal section along II—II in FIG. 1.

In FIGS. 1, 2 and 3 the band and its loop 2 are represented in the position of moulding, that is to say, positioned on the flat, at least as far as the link 3 is concerned.

Figure 7:
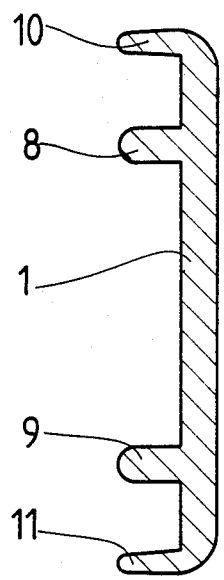
FIG. 7 is a section along VII—VII in FIG. 1.

The band 1 exhibits on its inner face two inner longitudinal ribs 8 and 9 intended for being engaged between the two cheeks of the spool and two outer ribs 10 and 11 intended for being engaged against the outer face of the cheeks of the spool (FIG. 7). Over the greater portion of the periphery of the spool these ribs 10 and 11 are much lower than shown in FIG. 7. At the end of the band as shown a column 12 is formed, which consists of a transverse portion 13 extending across about half of the width of the band 1 and integral with two longitudinal brackets 14 and 15 to ensure the rigidity of the column. The transverse portion 13 of the column exhibits, facing the link 3, two oblique vertical edges 16 and 17 and facing the band, two small transverse faces 18 and 19 on opposite sides of the brackets 14 and 15.

The link 3 exhibits two arms 20 and 21 connected to the band 1 by the two portions 4 of reduced thickness formed at the upper ends of two bases 22 (FIG. 3). These arms 20 and 21 exhibits a L-shaped profile and on the sides of them facing one another swellings are provided which exhibit next the column 12 a ramp 23 and 24 respectively, followed by a small face parallel with the plane of the link (FIG. 5).

The loop 2 is in the form of a hood the transverse edge 26 of the end of which is slightly cranked backwards. This shape enables the loop to be hooked over the hook 6 and to cover it (FIG. 9).

Figure 8:
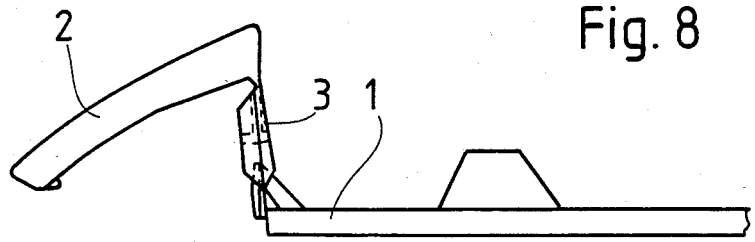
FIG. 8 represents the loop raised into the pre-hooking position.

When making use of the binding loop the link 3 is raised by making it pivot about its hinge 4 as indicated in FIG. 2. The ramps 23 and 24 on the link 3 come to a stop against the edges 16 and 17 of the column 12. With the use of a little force the arms 20 and 21 spread slightly elastically and the small face 25 on these arms pass behind the column. A return to the original position is no longer possible because the small faces 25 come to a stop against the small faces 18 and 19 on the column. Thus the desired pre-hooking position is obtained as represented in FIG. 8.

Figure 9:
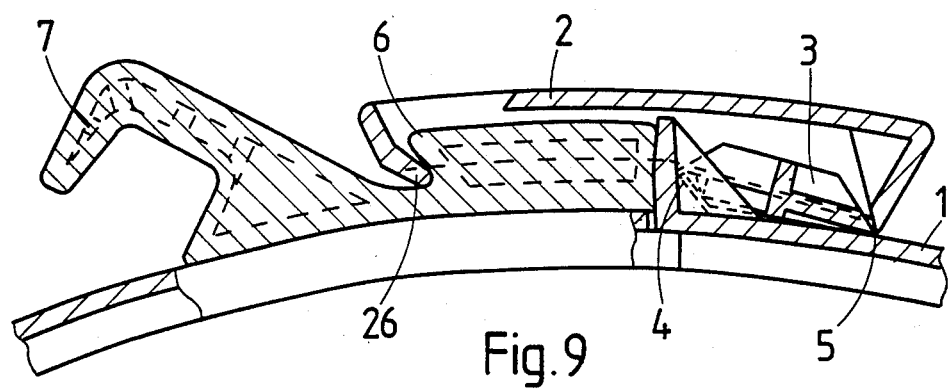
FIG. 9 represents the two ends of the ring in the closed position.

In the position of closure as represented in FIG. 9, the link 3 becomes applied against the band 1 after having functioned as a toggle, that is to say, after having passed through a position of maximum tension in which the points of pivot 26, 5 and 4 are in line.

Figure 10:
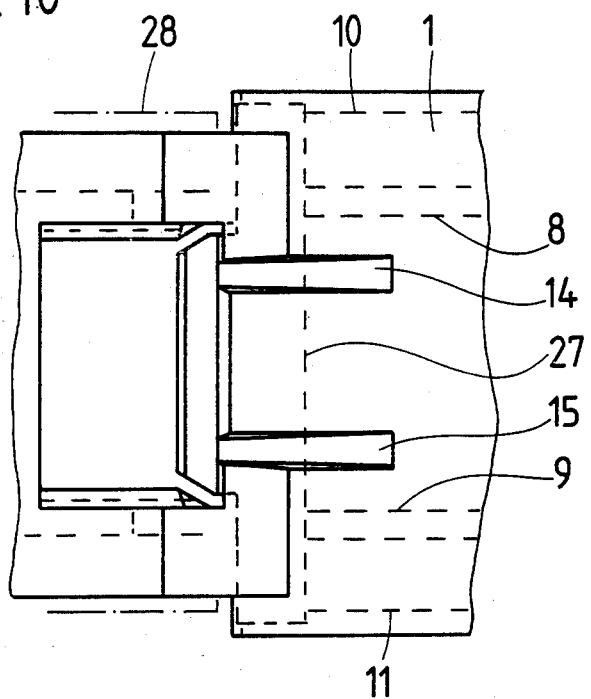
FIG. 10 represents a variant in a view corresponding with FIG. 1.
Figure 11:
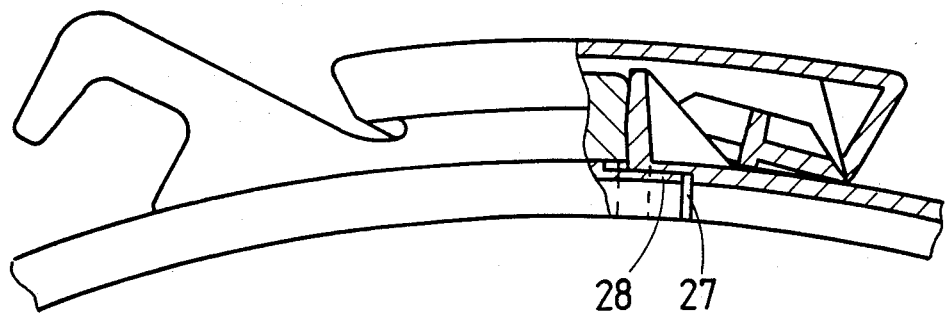
FIG. 11 is a partial section of the two ends of the band in the closed position in accordance with the variant embodiment represented in FIG. 10.

The diameters of the spools which are to be bound may vary within certain limits. This variation is multiplied by 3,14 for the circumference. In FIG. 9, the two ends of the band 1 have been represented butting against one another, but taking into account the aforesaid variations, it is judicious to provide a certain play so that a ring may be stretched both round a spool of minimum circumference and round a spool of maximum circumference. Because of the elasticity of the loop, that means that a ring stretched round a bobbin of maximum circumference will exhibit a gap between the ends of the band 1. Now, such a gap forms a hole which lets dust penetrate into the spool. The variant embodiment represented in FIGS. 10 and 11 has the aim of obivating this disadvantage. In this variant embodiment the end of the band 1 carrying the loop exhibits a rectangular clearance 27 which interrupts the ribs 8 and 9 and penetrates into half of the thickness of the band 1 under the brackets 14 and 15. The other end of the band exhibits an end 28 of reduced thickness over half of its thickness in the other direction from and of width very slightly less than the width of the clearance 27 so that this portion 28 can enter the clearance 27 with a slight play. The portion 28 is shown in dash-dot line in FIG. 10. This penetration of one of the ends of the band into the other enables one to have a variation in the circumference of the stretched closed loop whilst preserving the overlap of the two ends of the band, that is to say, whilst avoiding the formation of a hole.

Numerous variants in the execution are possible without departing from the scope of the invention. In particular, it would be sufficient to provide oblique faces either on the arms 20 and 21 of the link 3 or only on the column 12.

It would be equally possible to provide a link exhibiting only one central arm separating two columns at the time of raising it.

The column 12 might consist of an added piece. It might equally well be reinforced by a metallic piece.

What is claimed is:

1. A ring for sealing and storage of a spool of recording tape said spool having a hub and a pair of parallel circular cheeks, defined by opposite sides the ring comprising: a band of flexible and extensible material, equipped with longitudinal ribs for engaging said opposite sides, said band having one end with a hook and a second end with a loop hingedly connected to said second end, said loop being provided to close and stretch the ring around the spool by engaging said hook, the loop being hinged onto the band by a link rotatable toward an open position restricted by stop means; the band, the loop and the link being in one piece; the link being hinged onto the band by a zone of reduced thickness; wherein the band is equipped in the zone with at least one column which intercepts the path of the link, one of the link and the column exhibiting an oblique flank provided to enable the link to pass beyond the column by elastic deformation when said link is rotated away from said open position and for preventing said link from returning to said open position.

2. A ring as in claim 1, in which the link is hinged onto the band by two arms with sides wherein the band includes a central column and the arms have an L-shaped profile, the sides facing one another exhibiting a swelling consisting of a ramp followed by a small face which is perpendicular to the plane of the path of the link and by which each of the arms comes to a stop against the column in a position of maximum opening after having passed beyond the column the first time by spreading apart elastically.

3. A ring as in claim 1, wherein the second end has a clearance which extends across about half the thickness of the band, whilst the one end of the band exhibits a reduced thickness and a contraction corresponding with the dimensions of the said clearance to provide an overlap of the two ends of the band across a certain area.

4. A ring as in claim 1, wherein the said column is in addition connected to the band by two brackets extending in the direction of the band.

5. A ring as in claim 1, wherein the band and its loop are of polypropylene.

* * * * *